No. 704,663. Patented July 15, 1902.
A. PELLANT.
TWO-SPEED DRIVING GEAR FOR CYCLES.
(Application filed June 25, 1901.)
(No Model.) 2 Sheets—Sheet 1.
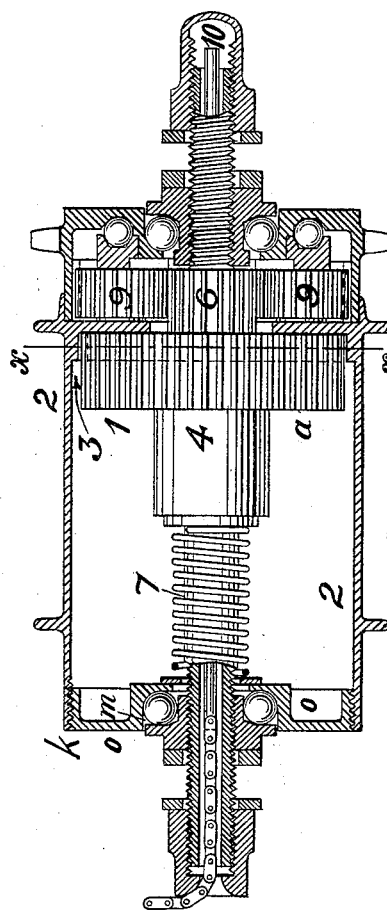
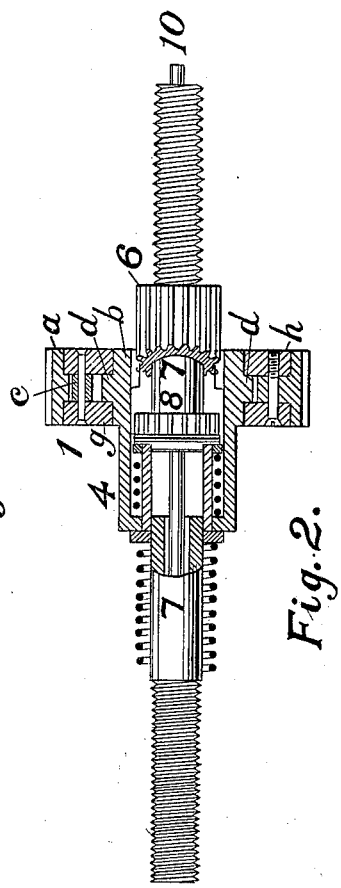
WITNESSES. INVENTOR
Joseph Bates. Alfred Pellant
Arthur Robinson by Owen O'Brien
atty No. 704,663. Patented July 15, 1902.
A. PELLANT.
TWO-SPEED DRIVING GEAR FOR CYCLES.
(Application filed June 25, 1901.)
(No Model.) 2 Sheets—Sheet 2.
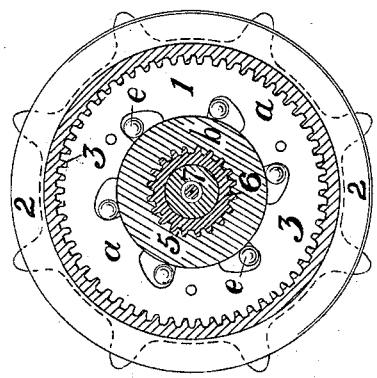
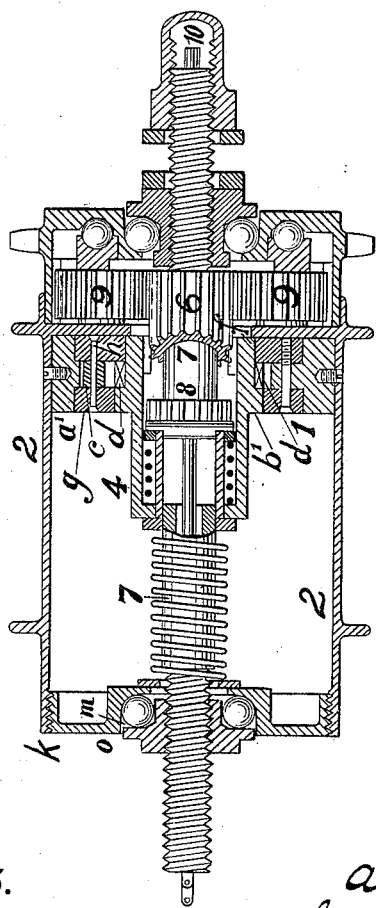
WITNESSES.
Joseph Bates.
Arthur Robinson
INVENTOR.
Alfred Pellant

UNITED STATES PATENT OFFICE.

ALFRED PELLANT, OF LONDON, ENGLAND, ASSIGNOR TO THE HUB TWO SPEED GEAR COMPANY, LIMITED, OF SALFORD, ENGLAND.

TWO-SPEED DRIVING-GEAR FOR CYCLES.

SPECIFICATION forming part of Letters Patent No. 704,663, dated July 15, 1902.

Application filed June 25, 1901. Serial No. 66,025. (No model.)

*To all whom it may concern:*

Be it known that I, ALFRED PELLANT, wholesale factor, a British subject, and a resident of London, England, have invented certain new and useful Improvements in Two-Speed Driving-Gear for Bicycles, of which the following is a specification.

This invention relates to speed-gears for cycles contained in the hub, such as are known as the "hub two-speed gear" and described in the specification of Reilly and Haigh's patent, No. 588,657, dated August 24, 1897, and the application Serial No. 15,781 of 1900, and is designed to provide a constant free wheel when the gear is on the high speed.

In the hub two-speed gear as at present constructed it is only possible to obtain what is known as the "free-wheel motion"—that is, the continuous revolution of the wheel while the cranks remain stationary—by throwing the cranks out of gear when the changing mechanism is between the gears.

This invention consists, essentially, in an enlarged hub-barrel and an enlarged fixed clutch therein which contains the teeth for the high or normal gear and an enlarged sliding clutch constructed in two parts with an inner ring or center provided with ratchet-teeth on its periphery free to move in one direction, but locked or prevented rotating in the reverse direction (relative to the hub) by ratchets pivoted to the outer part or ring, which part engages with the clutch-teeth on the internal periphery of the hub-barrel. It will be fully described with reference to the accompanying drawings.

Figure 1 is a side elevation, partly in section, of a two-speed gear-hub constructed with my invention, the parts being in position for normal or high gear; Fig. 2, a longitudinal section of parts of same; Fig. 3, a transverse section on line $xx$, Fig. 1: Fig. 4, a transverse section showing friction balls or rollers instead of the pawls; Fig. 5, a longitudinal section showing a modified arrangement of construction.

The clutch-wheel 1, which engages with the interior of the hub 2, is made in two parts or rings $a$ and $b$. The outer part or ring $a$ is provided with external teeth to engage the teeth 3 on the interior of the hub and is also provided with a number of pawls $c$, pivoted to it, to engage with ratchet-teeth $d$. The inner part or ring $b$ is attached to or forms part of the sliding clutch 4 and is formed with ratchet-teeth $d$ upon its periphery, with which the pawls $c$ engage. The ratchet-teeth $d$ of the ring $b$ and the pawls $c$ of the ring $a$ are so set that the inner ring $b$ may revolve in advance of or at a greater speed than the outer ring $a$, but so that the inner ring $b$ cannot rotate backward or in a reverse direction.

The inner ring $b$ is provided with internal teeth 5, which gear with the pinion 6, loose on the spindle 7, or with the teeth 8, attached to the spindle 7, according to the position in which it is placed. When the inner ring $b$ is in gear with the pinion-wheel 6, the outer ring $a$ is in gear with the teeth 3 on the hub and locked thereto, and when the ring $b$ is in gear with the teeth 8 on the spindle 7 the outer ring is free and out of contact with the teeth 3. In the former position (shown in Fig. 1) the ratchet or free-wheel mechanism is in operation.

Referring to Fig. 4, instead of pawls and ratchets friction balls or rollers $e$ may be inserted between the outer ring $a$ and the inner ring $b$.

Referring to Fig. 5, the outer ring $a'$ may be made with a smooth outer periphery and fixed to the hub-barrel 2 by a screw or otherwise. To the interior of this ring the pawls $c$ are pivoted. The inner ring $b'$, forming the clutch, is made with teeth $d$ on the periphery and a smooth surface $f$ at one side of the teeth to permit of it being drawn aside until the pawls $c$ rest upon the smooth surface, and thus change the gear.

The inner and outer rings $a$ and $b$ are secured in position together by the side plates or washers $g$ and $h$, secured to the outer ring $a$.

The gear-wheels 9, the spindle 7, and the slide 10 for operating the clutch 4 are such as described in the specification of the former patent of Reilly and Haigh, No. 588,657, dated August 24, 1897, and application Serial No. 15,781, of 1900.

To enable the ball-races of the hub 2 to be of an ordinary size, I cut a thread $k$ in the end of the hub-barrel 2 and screw or shrink a ring $e$ to form the ball-race $m$ into the same, securing it from working loose by a pinching screw or bolt or one or more small screws between the threads, so as to be easy for removal, or in any other suitable manner.

When the hub mechanism is set, as in Fig. 1, on the high or normal gear, the ratchet-wheel $b$ will be locked or prevented rotating independently of and in the reverse direction to the hub by the pawls $c$. On the cranks and chain-wheel being retarded or stopped, the hub 2 will continue to rotate, carrying around with it the pinions 9. This movement causes the pinions 9 to rotate on their own axes, while they revolve around the central pinion 6 and give a rapid rotation to the pinion 6 on the spindle 7. As the inner ring $b$ and ratchet-teeth $d$ rotate with the pinion 6 these will rotate past the pawls $c$ at a higher speed in the same direction as the hub 2 and outer ring $a$.

What I claim as my invention, and desire to protect by Letters Patent, is—

In a two-speed gear for cycle-wheels the combination with the hub 2 provided with internal teeth 3, the spindle 7 provided with teeth 8, and the loose gear-pinion 6 on the spindle of the sliding clutch formed of two parts $a$ and $b$, the outer ring $a$ provided with external teeth engaging with teeth 3 on the hub, pawls $c$ pivoted thereto, and the inner part $b$ provided with external ratchet-teeth $d$ with which the pawls engage and internal teeth to engage the pinion 6 or teeth 8 on the spindle and the sliding clutch-sleeve 4 substantially as described.

In witness whereof I have hereunto signed my name, in the presence of two subscribing witnesses, this 13th day of June, 1901.

ALFRED PELLANT.

Witnesses:
 THOMAS JOHN SHINKFIELD,
 FREDERICK NIEMEYER.